United States Patent [19]
Furuya

[11] Patent Number: 5,582,129
[45] Date of Patent: Dec. 10, 1996

[54] ON-VEHICLE DISPLAY

[75] Inventor: Yoshiyuki Furuya, Susono, Japan

[73] Assignee: Yazaki Corporation, Tokyo, Japan

[21] Appl. No.: 253,792

[22] Filed: Jun. 3, 1994

[30] Foreign Application Priority Data

Jun. 4, 1993 [JP] Japan ..................... 5-134459

[51] Int. Cl.$^6$ ........................ G01R 1/08
[52] U.S. Cl. ............ 116/284; 116/288; 324/154 PB
[58] Field of Search .................. 116/62.1, 62.2, 116/62.3, 62.4, 284, 285, 286, 287, 288, 327, 328, 329, 330, 331, 332, DIG. 6, DIG. 23, DIG. 36, DIG. 45; 324/150, 151 R, 154 R, 154 PB, 155; 353/11, 12, 13, 14; 359/630, 857; 345/7

[56] References Cited

U.S. PATENT DOCUMENTS

| | | | |
|---|---|---|---|
| 4,962,998 | 10/1990 | Iino ........................ | 353/14 X |
| 4,967,191 | 10/1990 | Iino ........................ | 353/14 X |
| 5,062,135 | 10/1991 | Ohike .................... | 324/154 R |
| 5,142,274 | 8/1992 | Murphy et al. .......... | 116/286 X |
| 5,173,682 | 12/1992 | Murphy et al. .......... | 116/288 X |
| 5,223,791 | 6/1993 | Umehara ................ | 324/151 A |
| 5,237,455 | 8/1993 | Bordo et al. ............. | 359/632 |

FOREIGN PATENT DOCUMENTS

| | | | |
|---|---|---|---|
| 4303227 | 8/1993 | Germany ................ | 359/630 |
| 4303710 | 10/1992 | Japan .................... | 362/23 |

Primary Examiner—William A. Cuchlinski, Jr.
Assistant Examiner—Willie Morris Worth
Attorney, Agent, or Firm—Nikaido, Marmelstein, Murray & Oram LLP

[57] ABSTRACT

An on-vehicle display apparatus includes an analog meter mounted with a display surface facing downwardly within a meter hood of an instrument panel of a vehicle. A reflector is disposed below the meter to reflect a display image of the analog meter through an opening of the instrument panel into a driver's eyes so that the driver views a virtual image of the analog meter behind the reflector. The on-vehicle display includes a movement which has a rotating shaft and is positioned such that the movement is above the display surface. A pointer shaft rotatably is eccentric with the rotating shaft and is supported by a bearing. The pointer shaft has a pointer attached to a distal end thereof projecting below the display surface. The pointer angularly moves over the display surface together with the pointer shaft. A rotation transmitting means is provided between the rotating shaft and the pointer shaft for transmitting rotation of the rotating shaft to the pointer shaft.

5 Claims, 7 Drawing Sheets

ON-VEHICLE DISPLAY

BACKGROUND OF THE INVENTION

1. The present invention relates to a reflection type on-vehicle display where an analog meter is oriented downwardly within a meter hood and a display image of the meter is reflected by a reflector into the driver's eyes so that the driver sees a virtual image behind the reflector.

2. Prior Art

Conventional on-vehicle displays are mounted on the instrument panel of the vehicle to indicate various vehicle conditions to the driver. Such displays are designed so that the driver directly looks at a display image of the display. The driver sees scenes outside of the vehicle through the front windshield while driving. When he needs to know vehicle information such as speed, the driver has to substantially move his eyes to look at the display. It is difficult for the driver to quickly focus his eyes on the display close to his eyes after looking at a far way scene through the windshield, and vice versa. This is particularly inconvenient when the vehicle is running at a relatively high speed.

Figure 6:
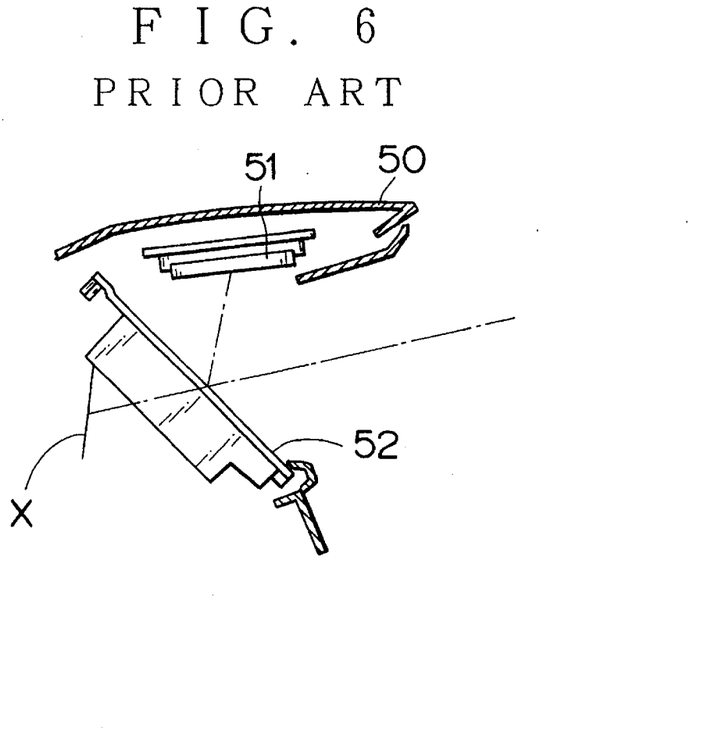
FIG. 6 is a side view of a prior art reflection type on-vehicle display.

To overcome the aforementioned drawbacks, a reflection type on-vehicle display has been proposed where the display image is reflected by a reflector into the driver's eyes so that the driver sees the virtual image of the display at a long imaginary distance behind the reflector. Such a reflection type on-vehicle display allows the driver to look at the display without having to move his eyes through a large angle. FIG. 6 shows one such type of on-vehicle display. In the figure, a display or meter 51 is placed in position within a meter hood 50 and is oriented downwardly. Behind the display 51 is positioned a reflector 52 which reflects the image of the display 51 into the driver's eyes so that the driver sees a virtual image X behind the reflector 52.

Conventionally, the above-mentioned display 51 takes the form of a digital display. Digital displays are usually expensive compared with analog type displays, necessitating higher overall costs of on-vehicle display apparatus. Besides, some users prefer analog type meters to digital type meters. An analog type meter is designed so that a movement causes a pointer to rotate over the dial to indicate information on the vehicle. Many of the movements are of a cross coil type having a pair of coils which generate magnetic fields crossing each other. A current flows through each of the coils in accordance with a physical quantity to be measured, driving a magnet rotator into rotation in a direction of a resultant magnetic field produced by the pair of coils. The pointer moves with the magnet rotator to indicate the information on the vehicle.

Figure 7:
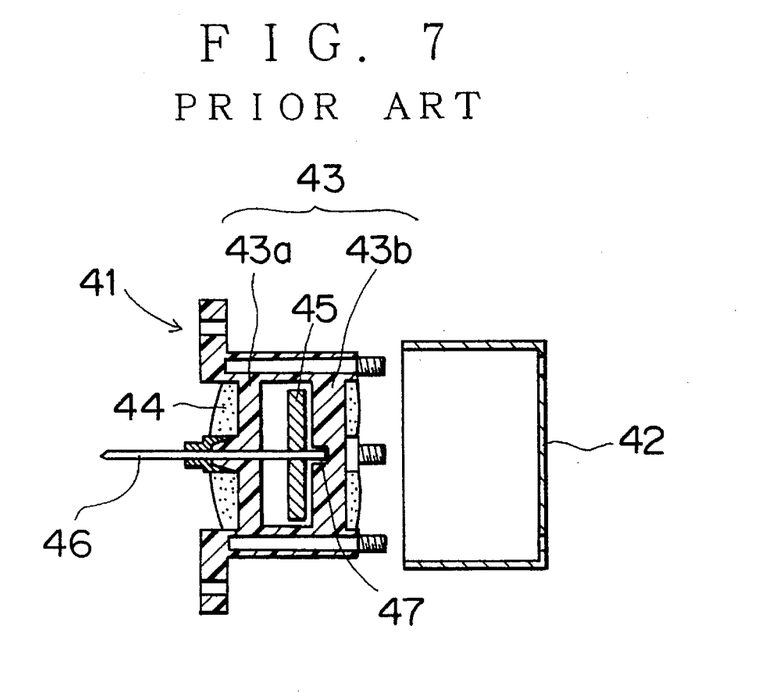
FIG. 7 is a cross-sectional view of a cross coil.

FIG. 7 shows one such cross coil type movement. A movement 41 is provided with a cylindrical case 42 with its bottom closed. The case 42 has a coil bobbin 43 including an upper bobbin 43a and a lower bobbin 43b. Two coils 44 and 44 are wound around the coil bobbin 43 so that coils 44 and 44 cross each other. A magnet rotator 45 having magnetic poles S and N is positioned within the coil bobbin 43, rotating shaft 46 extends through the center of the magnet rotator 45 in line with the longitudinal axis of the coil bobbin 43. The coil bobbin 43 has a space for housing the magnet rotator 45. The space is formed with a recess in a bottom thereof as a bearing 47 at the center of the bottom of the space. The bearing 47 is filled with silicone oil.

Figure 8:
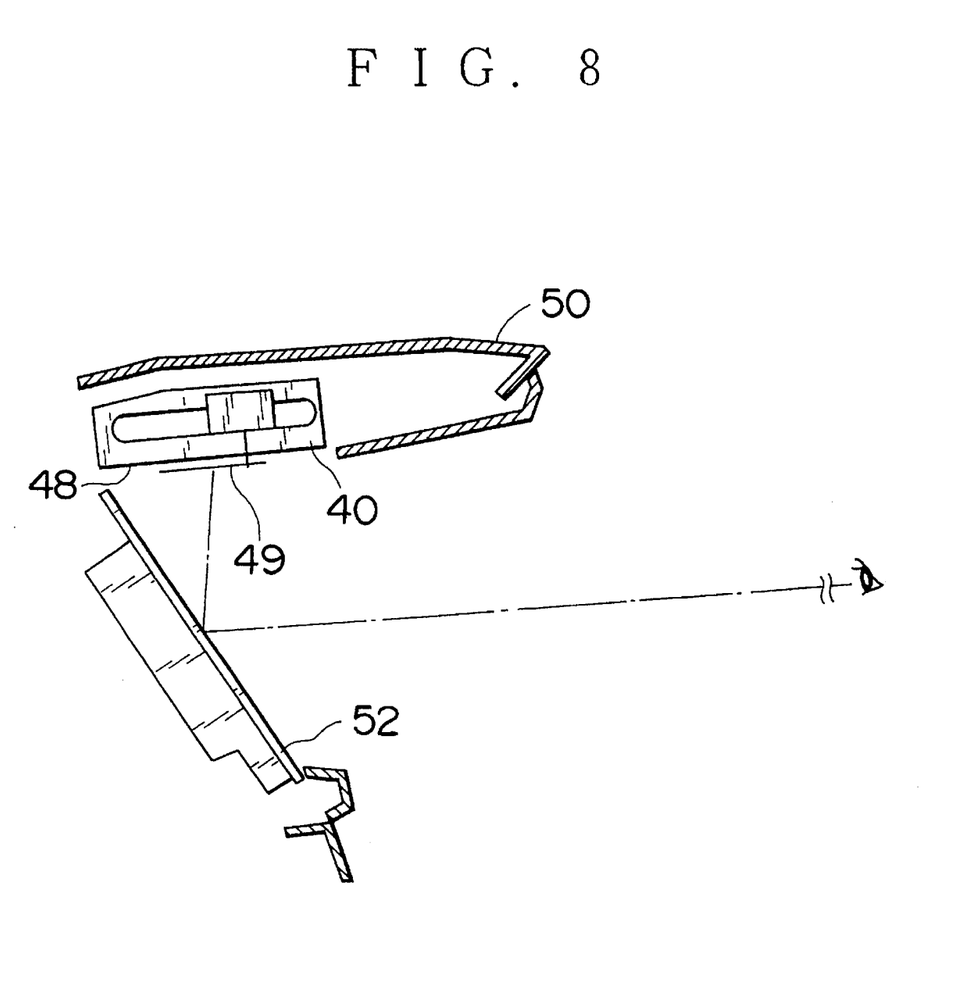
FIG. 8 is a side view of an analog meter as a display for use in a reflection type on-vehicle display.

The bearing 47 rotatably supports the shaft 46 while at the same time the silicone oil applies a damping force to the shaft 46 so that the pointer will not vibrate while the vehicle is running or will not oscillate about the shaft 46 before it properly indicates information on the vehicle. The magnet rotator 45 and the shaft 46 are free to rotate in all angles when the coils are not energized, and are driven to rotate through an appropriate angle when the coils are energized. A dial 48 is mounted above the movement 41 as shown in FIG. 8. A pointer 49 is fixed to the end portion of the shaft 46 projecting outwardly of the dial 48.

When an analog meter 40 is mounted as shown in FIG. 8 in place of the digital meter 51 in FIG. 6, the silicone oil may leak from the bearing 47 since the movement 41 is oriented downwardly. In addition, a certain mechanism is required to support the shaft 46 of the movement 41.

SUMMARY OF THE INVENTION

An object of the present invention is to provide an on-vehicle display where the pointer and rotating shaft of the movement of an analog meter are properly supported as well as the silicone oil for damping vibration of the rotating shaft of the movement is prevented from leaking even when the analog meter is oriented downwardly.

An on-vehicle display apparatus includes an analog meter mounted with a display surface facing downwardly within a meter hood of an instrument panel of a vehicle. A reflector is disposed below the meter, which reflector reflects a display image of the analog meter through an opening of the instrument panel into a driver's eyes so that the driver views a virtual image of the analog meter behind the reflector. The on-vehicle display includes a movement which has a rotating shaft and is positioned such that the movement is above the display surface. A pointer shaft is eccentric with the rotating shaft of the movement and is supported by a bearing. The pointer shaft projects downwardly of the face of the dial and a pointer is attached to a distal end of the pointer shaft. The pointer angularly moves over the display surface together with the pointer shaft to point to an appropriate value on the dial. A rotation transmitting means is provided between the rotating shaft and the pointer shaft for transmitting rotation of the rotating shaft to the pointer shaft.

One aspect of the invention is that the rotation-transmitting means is in the form of gears.

Another aspect of the invention is that the pointer shaft is positioned at one of the terminals of the movement.

BRIEF DESCRIPTION OF THE DRAWINGS

Features and other objects of the invention will become more apparent from the description of the preferred embodiments with reference to the accompanying drawings in which.

DESCRIPTION OF PREFERRED EMBODIMENTS

Operation

An input signal representative of information on the vehicle drives the rotating shaft of the movement into rotation through an angle in accordance with the value of the input signal. The rotation of the rotating shaft is transmitted to the pointer shaft via a gear train, so that the pointer shaft rotates through an angle accordingly to cause the pointer attached to the tip end portion thereof to angularly move pointing the corresponding information on the display surface. The display image is reflected by a reflector into the driver's eyes so that the driver views an virtual image behind the reflector. Since the movement is oriented upwardly, the silicone oil for applying a damping force to the rotating shaft will not leak or spill from the bearing that supports the rotating shaft.

Construction

Figure 1:
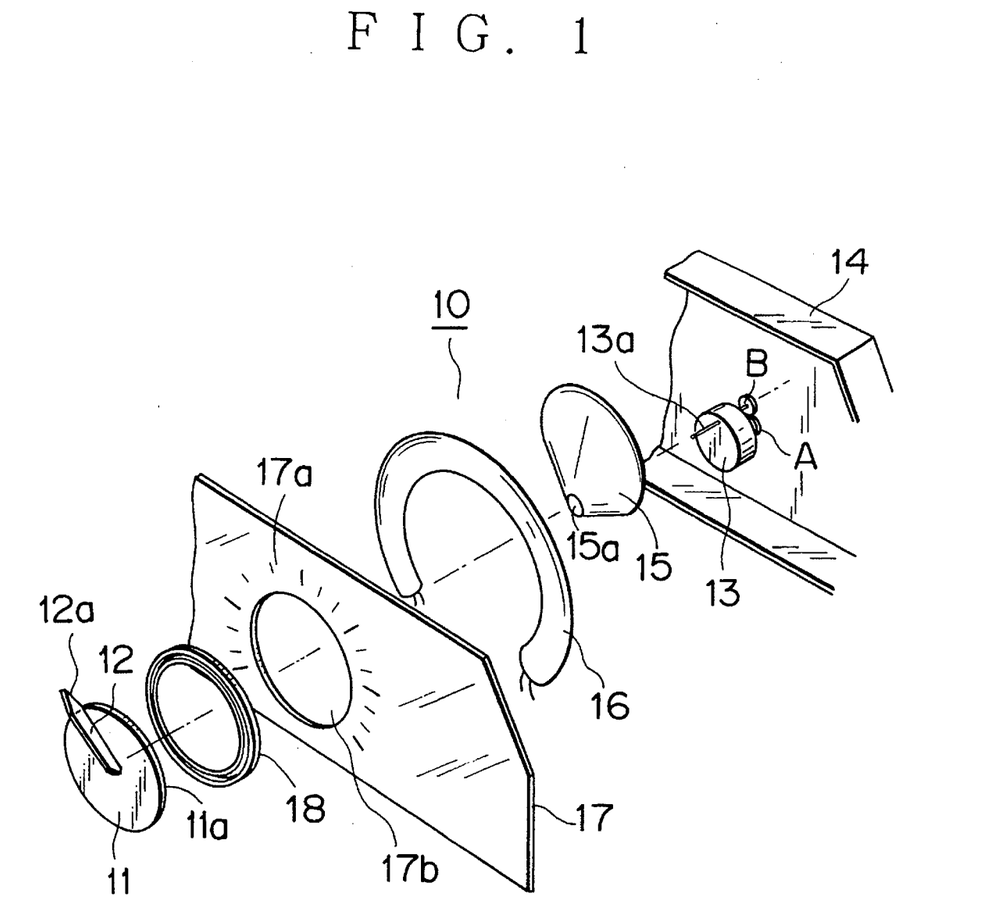
FIG. 1 is an expanded perspective view of an analog meter used in an on-vehicle display according to the present invention.

An embodiment of an on-vehicle display according to the present invention will be described in detail with reference to the drawings. FIG. 1 is an expanded perspective view of an analog meter 10 for use in an on-vehicle display of the invention. The analog meter 10 has a pointer assembly 11, which is in the form of an opaque disc having an edge thereof folded into a rim 11a. The pointer assembly 11 is formed with a light-transmitting slit therein and a light-transmitting pointer 12 is fitted into the slit so that the light entered the pointer 12 is directed to the tip end of the pointer 12 while being reflected in part within the pointer 12. The pointer 12 radially projects slightly beyond the circular edge of the pointer assembly 11.

The movement 13 for driving the pointer assembly 11 is of a cross coil type, described later in more detail. The movement 13 is mounted to the bottom of a meter case 14 so that the rotating shaft 26, not shown, extends on the side of the bottom of the meter case 14. The pointer shaft 13a of the movement 13 projects remotely from the meter case 14 relative to the movement 13. The pointer shaft 13a and the rotating shaft of the movement 13 are coupled together via gears A and B so that rotation of the rotating shaft 26 of the movement 13 is transmitted to the pointer shaft 13a via the gears A and B. It is to be noted that the pointer shaft 13a is not concentric with the movement 13.

A hollow conical reflector 15 is mounted on the rear side where the pointer shaft 13a projects, i.e., remote from the gears A and B. The conical reflector 15 has an eccentric top end where the top end is truncated to provide an opening 15a. An annular light source 16 is mounted so that annular light source 16 surrounds the reflector 15. Above the light source 16 is disposed a dial 17 in the form of a light-diffusing plate on which appropriate characters and calibrations 17a of an opaque material are circumferentially arranged for indicating information on the vehicle. The dial 17 is formed with a hole 17b therein whose diameter is slightly larger than that of the pointer assembly 11 so that the pointer assembly 11 smoothly rotates in the hole 17b provided at the center of the circumferentially arranged calibrations 17a. The light from the light source 16 is directly exposed to and reflected by the reflector 15 to the dial 17 so that the opaque characters 17a are highlighted. The light from the light source 16 is also directed to the pointer assembly 11 to cause the pointer 12 to glow. The pointer assembly 11 rotates together with the pointer shaft 13a when the rotating shaft 26 of the movement 13 rotates in accordance with an input signal thereof, thereby indicating the character and calibration corresponding to the input signal. A light leakage preventing ring 18 is fitted into the hole 17b. The light leakage preventing ring 18 has a concentric circular recess into which the rim 11a of the pointer assembly 11 slidably fits. The light leakage preventing ring 18 serves to prevent light from being leaking toward the circular edge of the pointer assembly 11, so that visibility of the dial is not disturbed. The pointer shaft 13a extends through the opening 15a of the reflector 15 into the center of the hole 17b and is fixed to the pointer assembly 11.

The movement 13, which is a feature of the analog meter 10 of the invention, will be described in detail.

Figure 2A:
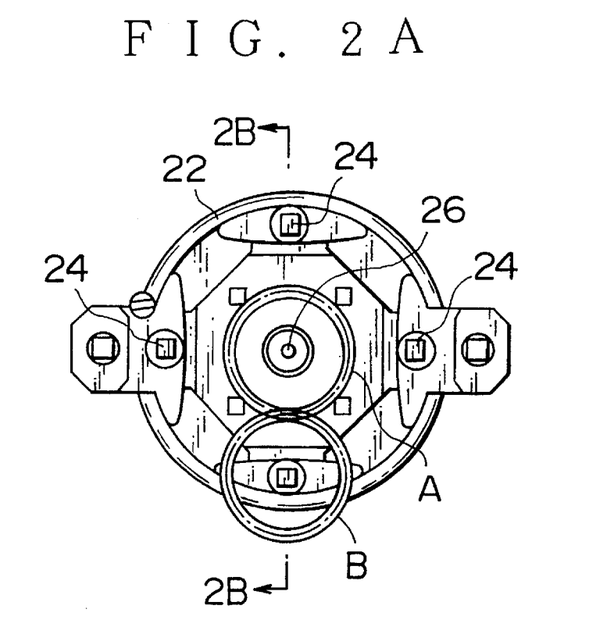
FIG. 2A is a top view of a cross coil used for an analog meter.
Figure 2B:
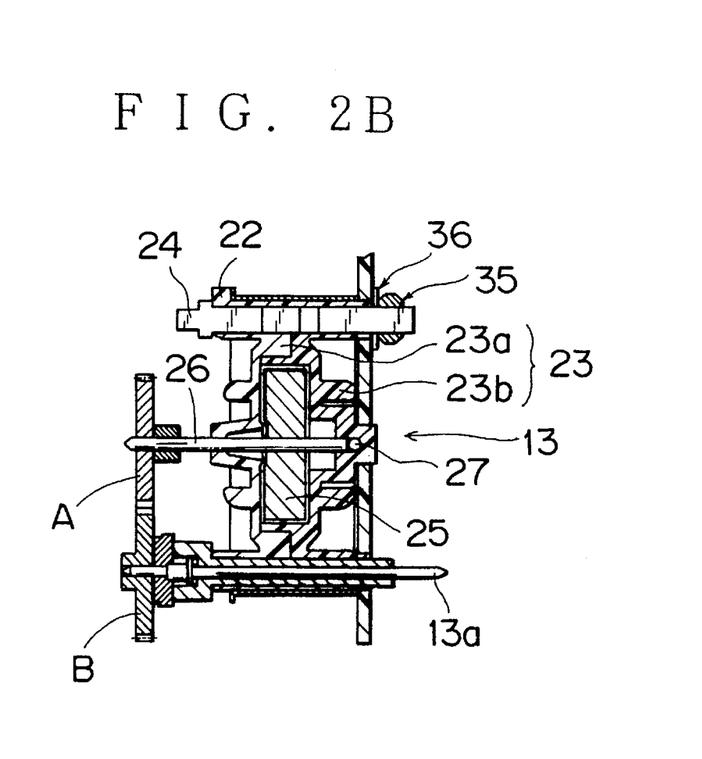
FIG. 2B is a cross-sectional side view of the cross coil in FIG. 2A.

FIG. 2A is a top view of the movement 13 and FIG. 2B is a cross-sectional side view taken along lines 2B—2B of FIG. 2A. The movement 13 is of a cross coil type and is provided with a cylindrical case 22 with a closed bottom. The case 22 houses a coil bobbin 23 that includes an upper bobbin 23a and a lower bobbin 23b. Two coils, not shown, are wound around the coil bobbin 23 in such a way that coils cross with each other. A disc-shaped magnet rotator 25 having magnetic poles S and N is disposed within the coil bobbin 23. A rotating shaft 26 extends through the center of the magnet rotator 25 substantially in line with the longitudinal axis of the coil bobbin 23. The coil bobbin 23 has a space 27 for housing the magnet rotator 25 therein. The space 27 has a recess formed at the center of the bottom thereof, which recess serves as a bearing 47. The bearing 47 is filled with silicone oil and rotatably supports the rotating shaft 26. The silicone oil applies a damping force to the rotating shaft 26 so that the vibration of the rotating shaft 26 is quickly damped. The magnet rotator 25 and shaft 26 are free to rotate in all angles when the coils are not energized, and are driven to rotate through an appropriate angle when the coils are energized. The terminals 24 are secured to tracks formed on a flexible cable 36 by means of a nut 35. The pointer shaft 13a is positioned at one of the terminals 24 of the movement 13 and the front end portion of the pointer shaft 13a projects in the direction opposite to the gears A and B as shown in FIG. 2B. The gear B attached to the pointer shaft 13a meshes with the gear A mounted to the rotating shaft 26, so that the rotation of the shaft 26 is transmitted to the pointer shaft 13a.

Figure 3:
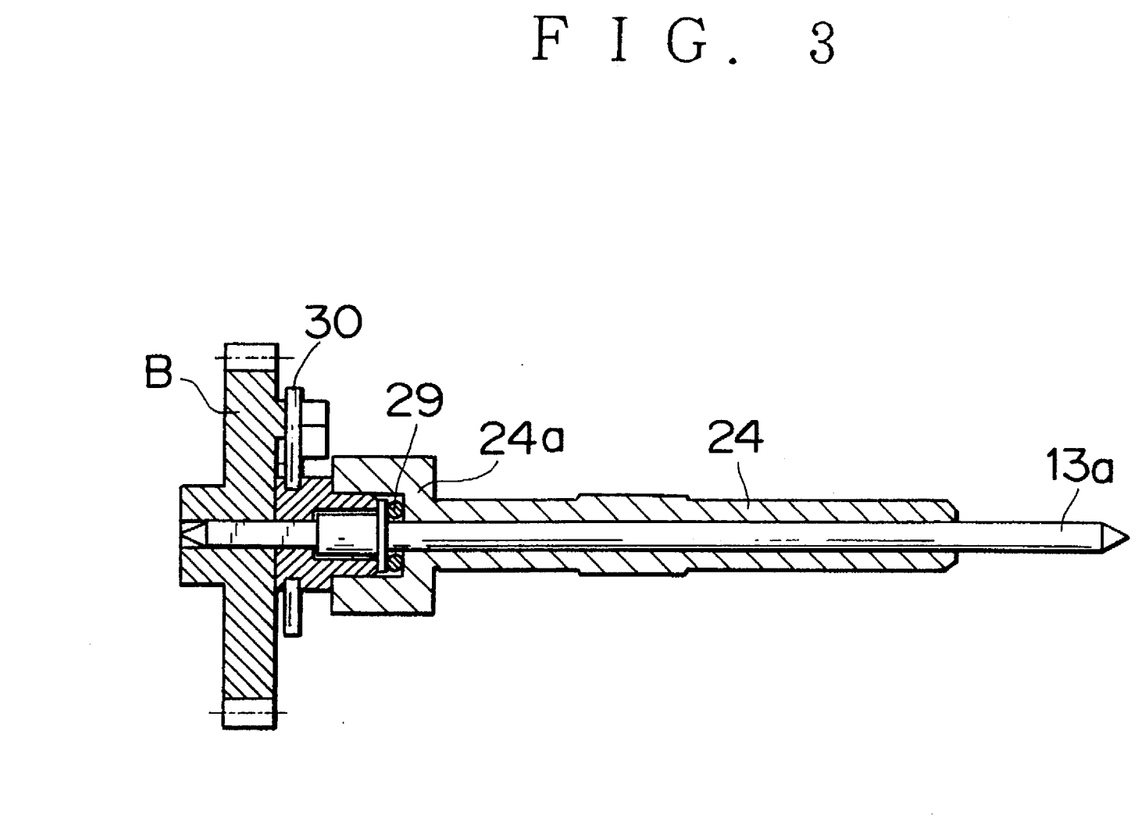
FIG. 3 is a cross-sectional view of a pointer shaft.

FIG. 3 is a cross-sectional view of a pointer shaft. In FIG. 3, one of the conventional terminals 24, shown in FIG. 2A, is modified into a bearing through which the pointer shaft 13a extends. The bearing and steel balls 29 support the pointer shaft 13a. A thrust bearing may be used in place of the steel balls 29 to properly support the pointer 13a. The terminal 24 and the pointer shaft 13a are constructed of a non-magnetic material so as not to affect the magnetic field acting on the magnet rotator 25 within the bobbin 23. A balance spring 30 operates as a zero-return spring that causes the pointer shaft 13a to return to its home angular position when the coils are deenergized.

Figure 4A:
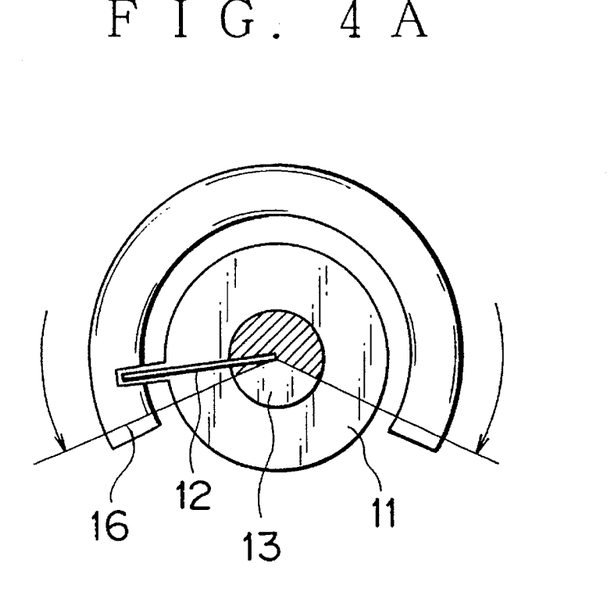
FIG. 4A shows a prior art analog meter.
Figure 4B:
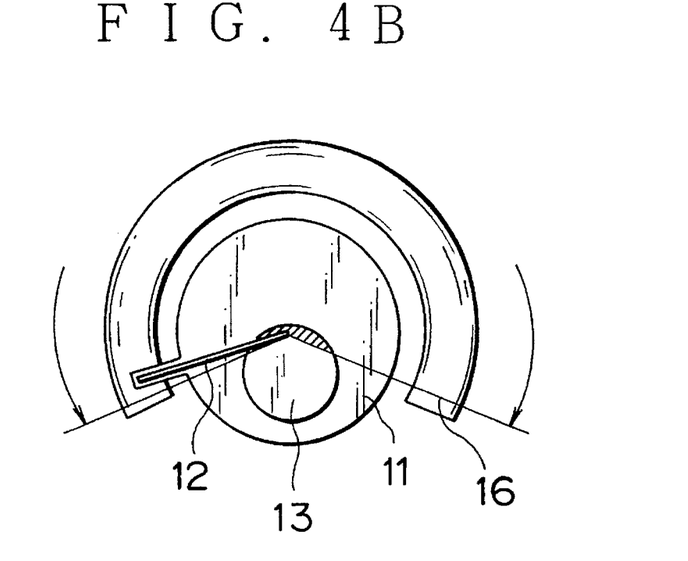
FIG. 4B shows a top view of an analog meter according to the present invention.

When arranging the analog meter based on the movement 13 with the display surface facing downwardly within the meter hood 50 as shown in FIG. 8, the movement 13 is oriented upwardly so that the silicone oil filled in the bearing 27 will not leak or spill and the rotating shaft 26 is still supported by the bearing 27. Thus, the display according to the invention does not necessitate modification to the coil bobbin, bearing, and rotator of the prior art movement. The reflector 15 may be omitted for thinner construction of movement 13, in which case, the shadow of the movement 13 may be observed through the transparent pointer 12 as depicted by the hatched portion in FIG. 4A if the pointer 13a is positioned at the center of the movement 13. This is due to the difference in brightness between the portion of the pointer 12 near the pointer shaft and the tip end of the pointer 12 near light source 16. This shadow will not substantially be observed if the pointer shaft 13a is not in line with the movement 13 as shown in FIG. 4B.

Figure 5A:
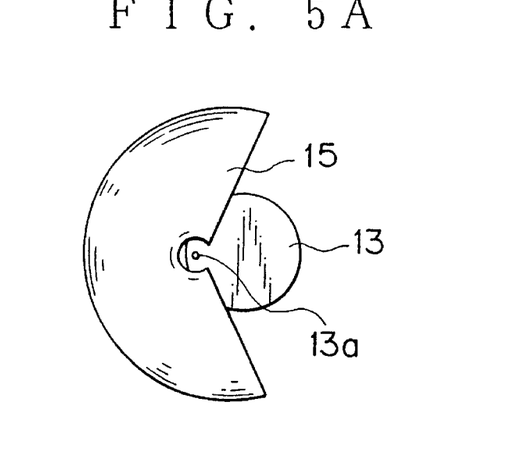
FIG. 5A is a partial top view of an analog meter according to the present invention.
Figure 5B:
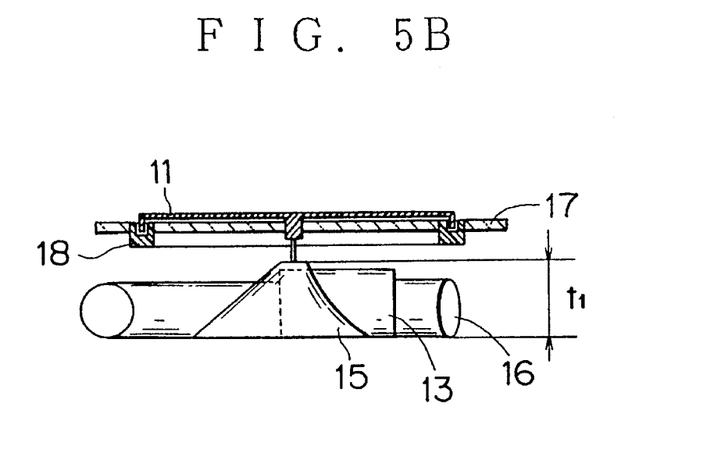
FIG. 5B is a side view of an analog meter according to the present invention.
Figure 5C:
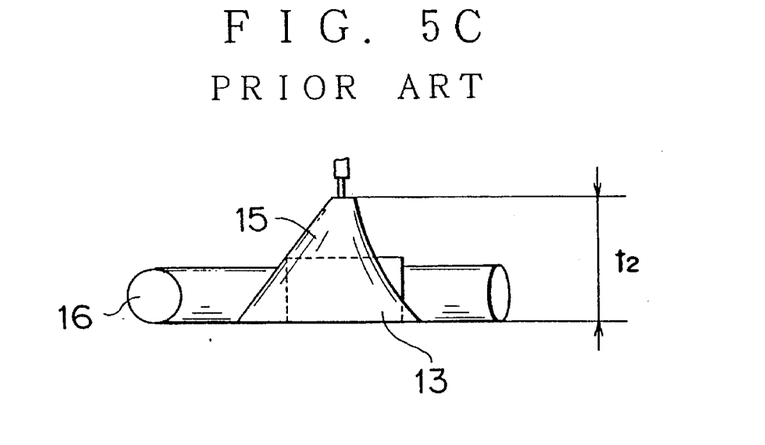
FIG. 5C shows a prior art analog meter.

FIG. 5A is a top view of the meter 10. FIG. 5B is a side view of an analog meter according to the present invention. FIG. 5C shows a prior art analog meter. If the conical reflector 15 is not omitted and the pointer 13a is positioned at the center of the movement 13, the height t2 of the reflector 15 makes the height of the meter 10 high as shown in FIG. 5C. However, if the pointer 13a is at a position away from the center of the movement 13 as shown in FIG. 5B, the height t1 of the reflector 15 will not result in thicker construction of the meter 10.

What is claimed is:

1. An on-vehicle display apparatus in which an analog meter is mounted with a display surface of a dial facing downwardly within a meter hood of an instrument panel of a vehicle, and a reflector is disposed below the meter to reflect a display image of the analog meter through an opening of the instrument panel into a driver's eyes so that the driver views a virtual image of the analog meter behind the reflector, comprising:

a movement positioned behind and vertically above said dial and having a rotating shaft;

a pointer shaft rotatably supported by a bearing, said pointer shaft being eccentric with said rotating shaft and having a pointer attached to a distal end thereof projecting below the display surface, wherein a rotation of said pointer shaft moves said pointer angularly across the display surface; and a rotation transmitting means connecting said rotating shaft and said pointer shaft for transmitting rotation of said rotating shaft to said pointer shaft, said rotation transmitting means being connected to said pointer shaft at an end opposite distal end of the pointer shaft.

2. The on-vehicle display apparatus according to claim 1, wherein said rotation transmitting means comprising a gear train.

3. The on-vehicle display apparatus according to claim 2, wherein said gear train includes a first gear attached to said rotating shaft and a second gear attached to said pointer shaft, and wherein said first gear meshes with said second gear to transmit rotation of said rotating shaft to said pointer shaft.

4. The on-vehicle display apparatus according to claim 1, wherein said pointer shaft comprises a non-magnetic material.

5. The on-vehicle display apparatus according to claim 1, wherein said movement has terminals for receiving an input signal, and wherein said pointer shaft is positioned through one of the terminals.

* * * * *